United States Patent [19]

Giacomel

[11] Patent Number: 5,279,022
[45] Date of Patent: Jan. 18, 1994

[54] METHOD AND APPARATUS FOR PROVIDING A MULTIDIRECTIONAL CLAMPING FORCE

[75] Inventor: Jeffrey A. Giacomel, Arlington, Tex.

[73] Assignee: Loral Vought Systems Corporation, Grand Prairie, Tex.

[21] Appl. No.: 922,933

[22] Filed: Jul. 31, 1992

[51] Int. Cl.[5] .................. B21D 26/00; F16B 19/00
[52] U.S. Cl. .......................... 24/703.1; 285/382.2; 29/421.2
[58] Field of Search .............. 24/703.1, 703.2, 703.3, 24/703.4, 703.5, 703.6; 285/382.2; 29/421.2

[56] References Cited

U.S. PATENT DOCUMENTS

| | | | |
|---|---|---|---|
| 2,367,206 | 1/1945 | Davis | 285/382.2 |
| 3,341,650 | 9/1967 | Broske | 29/421.2 |
| 3,759,551 | 9/1973 | Broske | 285/382.2 |

OTHER PUBLICATIONS

J. E. Kennedy, "Explosive Output for Driving Metal", *Behavior and Utilization of Explosives in Engineering Design and Biomechanical Principles Applied to Clinical Medicine*, pp. 109-124, published by New Mexico Section, American Society of Mechanical Engineers, Albuquerque, N.M., 1972.

O. E. Jones, "Metal Response Under Explosive Loading", *Behavior and Utilization of Explosives in Engineering Design and Biomechanical Principles Applied to Clinical Medicine*, pp. 125-148, published by New Mexico Section, American Society of Mechanical Engineers, Albuquerque, N.M., 1972.

M. A. Mogilevsky, "Mechanisms of Deformation Under Shock Loading", *Shock Waves and High-Strain-Rate Phenomena in Metals*, pp. 531-546, Plenum Press, New York, 1981.

"Tinel-Lock TM Heat-Recoverable Rings for Cable Shielding Termination", pp. 1-4, Raychem Corporation Metals Division, Menlo Park, Calif., Copyright 1985, printed Sep., 1988.

Tom Borden, "Shape Memory Alloy Fastener Rings", cover and pp. 1-22, Raychem Corporation, Menlo Park, Calif., May 11, 1990.

"Unilok TM Rings-A Revolution in Fastening, Sealing and Electrical Interconnection", pp. 1-6, Raychem Corporation Metals Division, Menlo Park, Calif., Copright 1991, printed May, 1991.

*Primary Examiner*—Victor N. Sakran
*Attorney, Agent, or Firm*—Richards, Medlock & Andrews

[57] ABSTRACT

A method and apparatus for providing a multidirectional clamping force to clamp selected materials together is disclosed and comprises a tube formed into a closed circular shape and formed of martensitic material and deformed in a first predetermined direction such that the cross-section of said tube is non-circular. An energetic material is loaded into the interior cavity of the tube. An ignition system is operatively positioned with respect to the tube and is capable of igniting the energetic material. Upon ignition of the energetic material, the tube is reconfigured to provide a clamping force in a predetermined direction to clamp the materials together.

20 Claims, 2 Drawing Sheets

METHOD AND APPARATUS FOR PROVIDING A MULTIDIRECTIONAL CLAMPING FORCE

TECHNICAL FIELD OF THE INVENTION

This invention relates generally to the providing of a force to two elements or structures to either force the two elements or structures together or to force the two elements or structures apart. More particularly, but not by way of limitation, this invention relates to a method and a deformable clamp to apply a force to two elements or structures to either force the two elements or structures together or to force the two elements or structures apart.

BACKGROUND OF THE INVENTION

Conventional fastening means and techniques include crimping, welding, adhesive bonding, threading, clamping, etc. The type of fastening means chosen would normally be influenced by the requirement of whether the fastening function is to be permanent or temporary, the complexity of the fastening operation, the cost of the fastening operation, the environment to which the fastener is exposed, the reliability required of the fastening means, the size and shape of the structure and material to be fastened together, etc.

The present invention provides apparatus as well as a method for fastening various structures as well as a structure and material together which is relatively uncomplicated in construction and operation, is applicable for large as well as small structures, is reliable, provides a relatively uniform clamping force or pressure, and is essentially immune to vibration, shock and thermal cycling, etc.

The present invention also provides apparatus which can be remotely actuated for applications in missiles, spacecraft, space structures, to provide a clamping or separating force as well as apparatus for use in construction of modular or collapsible structures for use in hostile environments such as the moon or Mars.

SUMMARY OF THE INVENTION

This invention provides a method and apparatus for providing a multidirectional clamping force to clamp material against a curved structure and, in one aspect, comprises a tube formed into a closed circular shape and formed of martensitic memory alloy or shape memory alloy material and deformed in a first predetermined direction such that the cross-section of said tube is non-circular. The material is placed between the curved structure and the tube. An explosive material or similar energetic material is loaded into the interior cavity or hollow portion of the tube. An ignition system is operatively positioned within the cavity of the tube and is capable of igniting the energetic material. Upon ignition of the energetic material, the tube is explosively or pyrotechnically driven from the non-circular cross-sectional shape to a generally circular cross-sectional shape and the tube is also heated by the ignition of the energetic material and is reconfigured by martensitic action with a decrease in the value of the inside diameter of the closed circular shape resulting in the clamping of the material against the curved surface.

In another aspect of the invention, the tube is deformed in a second predetermined direction rather than in said first predetermined direction such that the cross-section of the tube is non-circular. The tube is deployed in a planar configuration between two mutually confronting surfaces. Upon ignition of the energetic material, the tube is explosively driven from the non-circular cross-sectional shape to a generally circular cross-sectional shape and the tube is also heated by the ignition of the energetic material and is reconfigured by martensitic action to exert forces against the two confronting surfaces.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
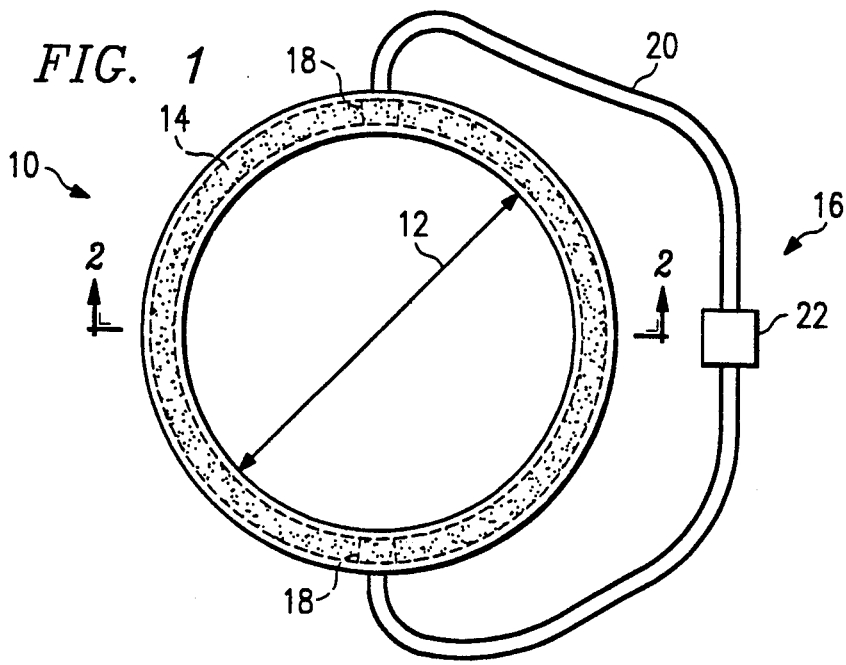
FIG. 1 is a simplified top plan view of a clamping device for providing a multidirectional clamping force to clamp material against a curved structure in accordance with the present invention.

Referring to the drawing and FIG. 1 in particular, shown therein and generally designated by the reference character 10 is a clamping device for providing a multidirectional clamping force in accordance with one embodiment of the invention. As illustrated, clamping device or circular clamp 10 comprises a predetermined length of tubing originally formed into a generally toroidal configuration or ring with the cross-section of the tubing being generally circular in shape as shown in phantom in FIG. 2 and with the toroidal configuration having an innermost annular surface and an outermost annular surface which are at least substantially circular. The midpoint or center of the tubing lies in a plane which will be referred to as the plane of the clamping device or circular clamp 10. The diameter of the opening 12 in the toroidal ring has a dimension of $d_1$.

Figure 2:
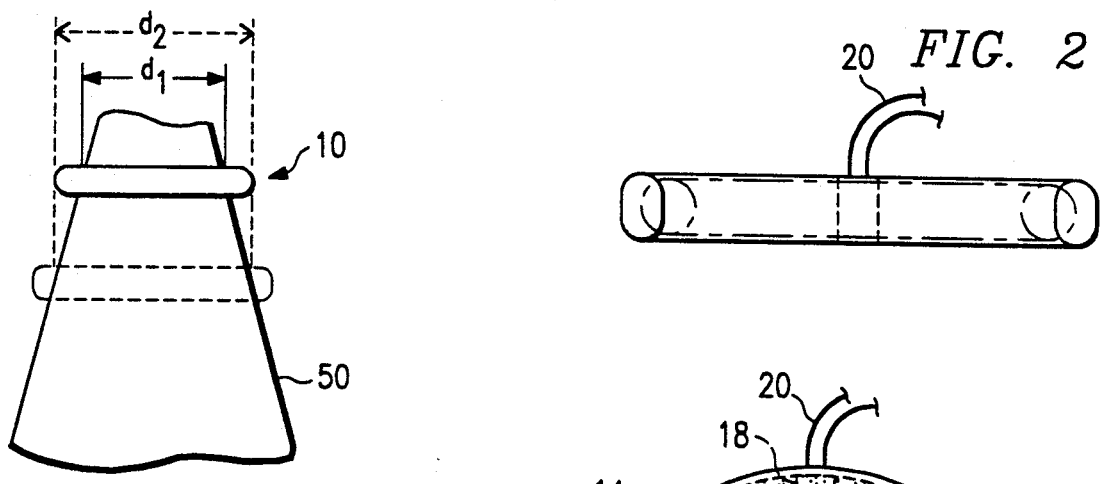
FIG. 2 is a simplified cross-sectional view of the clamping device for providing a multidirectional clamping force taken along 2—2 of FIG. 1.

In one embodiment, clamping device or circular clamp 10 is then deformed into the shape as shown in solid line in FIG. 2 such that the cross-section of the tubing is non-circular, e.g., at least generally elliptical or oval, rather than circular. The deformation occurs such that the major axis of the elliptical or oval shape is generally perpendicular to the plane of the clamping device or circular clamp 10. The diameter of the opening 12 formed by the clamping device or circular clamp 10 after being deformed has a dimension of $d_2$ and is larger or greater after the deformation step than the diameter of the opening 12 before the deformation step. The height of the tubing as measured perpendicular to the plane of the clamping device is greater after the deformation step than prior to the deformation step.

Figure 3:
FIG. 3 is a simplified side elevational view of the deformation step of the clamping device for providing a multidirectional clamping force.

One method of deforming the clamping device or circular clamp 10 is disclosed in FIG. 3 and includes the use of a cone-shaped mandrel 50. The originally formed clamping device 10 is positioned on the cone-shaped mandrel 50 as shown in solid line with the diameter of the opening 12 having a dimension of $d_1$. The clamping device 10 is then forced downwardly on the cone-shaped mandrel 50 to the position as shown in phantom wherein the diameter of the opening 12 now has a dimension of $d_2$. The dimension of $d_2$ can be as much as eight per cent greater than the dimension of $d_1$. During the deformation step, the cross-sectional shape of the tubing has become non-circular as depicted in phantom in FIG. 2.

It will be appreciated that a cylindrical mandrel with an expandable sidewall could be used in the deformation step instead of the conical mandrel.

The clamping device 10 is formed from a shape memory alloy or martensitic memory alloy. Shape memory alloys or martensitic memory alloys are a unique family of metals which exhibit a temperature dependent shape change. This change in shape is much more dramatic than that caused by thermal expansion and is produced by a completely different mechanism. A variety of alloys such as copper-aluminum-nickel, copper-zinc-aluminum, iron-manganese-silicon, nickel-titanium and Ni-Ti-niobium exhibit the shape memory effect. The most useful of these are alloys based on a nominal composition of 50 atomic percent nickel and 50 atomic percent titanium. Depending upon the alloy and its processing, the nickel-titanium alloy can be deformed five percent to eight percent in tension, compression or shear. Upon heating beyond a critical temperature, the metal alloy recovers to its original memory shape and, if resisted, can generate stresses as high as 700 MPa (100 kpsi). This unique effect is produced by a crystalline phase change known as a martensitic transformation. This transformation occurs over a range of temperature. Above this temperature range, the material is in the austenitic phase and below it, the material is in the martensitic phase. The geometric shape of the material when austenitic is termed the memory shape. The deformed martensite structure will hold its deformed shape indefinitely, as long as the temperature of the material is held below the transformation temperature of the alloy. If the deformed martensite structure is now heated through its transformation temperature range, it reverts to austenite. However, the austenitic crystalline structure cannot accommodate the deformation which was applied to the martensite. As a result, the deformed material must return to its original memory shape as it reverts to austenite. The transition temperature for suitable alloys will generally be in the range of about 120 degrees C to 430 degrees C.

After the deformation step, the tubing is then filled or loaded with an energetic material 14. An ignition system 16 is provided which is capable of igniting the energetic material 14.

The energetic material 14 used to provide the heat to cause the clamping device 10 to revert to its original memory shape is a typical high explosive such as HNS mixed with a thermitic compound such as magnesium or a magnesium compound such as magnesium teflon, but various formulations have been developed to improve the energy output by adding a heat generator to the HNS. The quantity of HNS varies with the required energy output which is dependent upon the diameter of the tubing used and the wall thickness of the tubing. Greater wall thickness of the tubing requires a greater amount of energetic material which results in a greater clamping force. The explosive chosen is a function of the sonic velocity of the material being worked and of the brisance and detonation velocity of the explosive Ignition system 16 comprises at least one and preferably two initiator interface units 18, a safe and arm device 22 and energy transfer lines 20 connected therebetween. The energetic material 14 is ignited by supplying an electrical ignition signal or current over the energy transfer lines 20 to the two initiator interface units 18 located generally at diametrically opposite sides of the clamping device 10. It will be appreciated that either one of the initiator interface units 18 alone is capable of successfully igniting the entire system.

When the energetic material 14 is ignited, two separate actions occur. The cross-sectional shape of the tubing is mechanically expanded, by the force provided by the ignited energetic material 14, back to a generally circular cross-sectional shape. This action of the clamping device 10 can be used to either firmly clamp a surface by going round, impart velocity to a structure to force uniform separation of structures and/or shear or cause a tensile failure of fasteners which hold a structure which is to separated from another structure, such as a shroud to a primary structure. The diameter of the opening 12 will generally be in the range of about one inch to about two feet, depending upon the particular application. The diameter of the tubing will generally be in the range of about one-quarter of an inch to about three-quarters of an inch with the wall thickness of the tubing being thinner for the one-quarter inch diameter tubing than for the three-quarter inch diameter tubing. It is critical that the explosive material (amount and velocity of reaction) be matched to the material comprising the tubing such that the structural integrity of the tubing is maintained and the tubing is not ruptured.

After the heat from the ignited energetic material is transferred to the tubing, the tubing is reconfigured by martensitic action, due to the shape memory effect, into an expanded toroidal configuration whereby its inner diameter is decreased.

Figure 4:
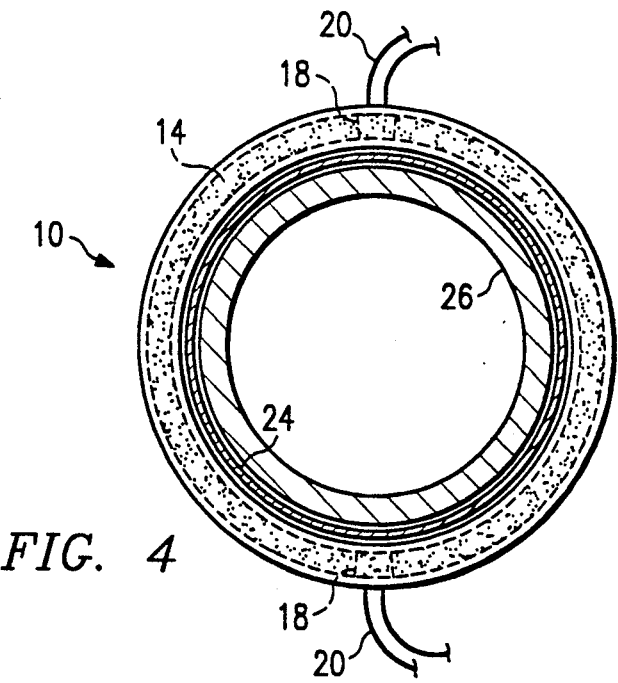
FIG. 4 is a simplified cross-sectional view showing the clamping device for providing a multidirectional clamping force clamping material against a curved structure.

With reference to FIG. 4, the embodiment of FIGS. 1 and 2 is shown in operative clamping relationship with sheet material 24 and curved structure 26. Sheet material 24 is placed between curved structure 26 and clamping device 10 in a non-clamping position. It will be appreciated that the dimension of $d_2$ is of a magnitude which allows clamping device 10 to be positioned around sheet material 24 and curved structure 26. The energetic material 14 is ignited by the application of an electrical ignition signal or current over the energy transfer lines 20 to the initiator interface units 18. The ignited energetic material mechanically reconfigures the cross-sectional shape of the tubing from non-circular back to generally circular. The ignited energetic material also heats the tubing causing the clamping device 10 to revert to its original memory shape of a toroidal configuration with the diameter of opening 12 decreasing and clamping the sheet material 24 against curved structure 26. As a result of the increase of the temperature of the clamping device 10 above its martensitic transition temperature, an eight percent reduction in the diameter of opening 12 from the original diameter is sufficient to form a gas tight seal between sheet material 24 and curved structure 26.

Figure 5:
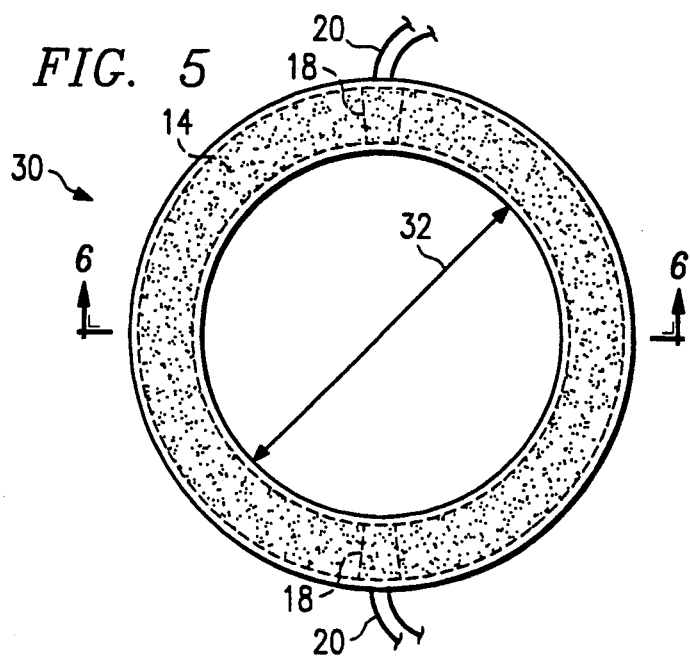
FIG. 5 is a simplified top plan view of an alternate embodiment of the clamping device for providing a multidirectional clamping force in accordance with the present invention.
Figure 6:
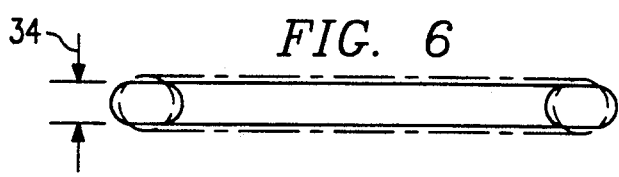
FIG. 6 is a simplified cross-sectional view of the clamping device for providing a multidirectional clamping force taken along 6—6 of FIG. 5.

Clamping device 30, an additional embodiment of the clamping device, is shown in FIGS. 5 and 6. As illustrated, clamping device or circular clamp 30 comprises a predetermined length of tubing originally formed into a generally toroidal configuration or ring in a plane with the cross-section of the tubing being generally circular in shape. Clamping device or circular clamp 30 is then deformed, e.g., by a press, into the shape as shown in FIG. 6 such that the cross-section of the tubing as shown in phantom is now generally elliptical or oval rather than circular. The deformation occurs such that the major axis of the elliptical or oval shape lies in the plane of the clamping device or circular clamp 30. The diameter of the opening 32 formed by the clamping device or circular clamp 30 is smaller after the deformation step than the diameter of the opening 32 before the deformation step and the height 34 of the tubing is less after the deformation step than the height of the tubing before the deformation step. The tubing used in clamping device 30 is formed from a shape memory alloy or martensitic memory alloy.

The tubing is then filled or loaded with an energetic material 14. An ignition system 16 is provided which is capable of igniting the energetic material 14.

Figure 7:
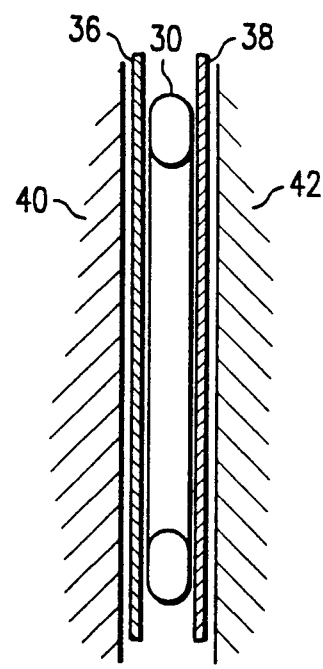
FIG. 7 is a simplified cross-sectional view of the clamping device for providing a multidirectional clamping force clamping material against a generally flat surface.
Figure 8:
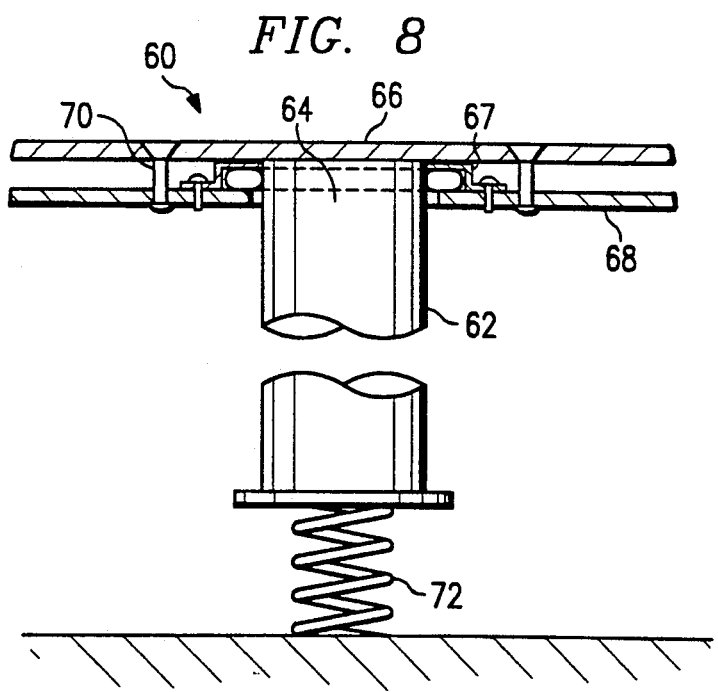
FIG. 8 is a fragmental cross-sectional view of the clamping device illustrating the use of the directional forces generated by the present invention.

With reference to FIG. 7, the embodiment of FIGS. 5 and 6 is shown in operative clamping relationship between sheet materials 36 and 38 which are positioned against two confronting surfaces 40 and 42. The energetic material 14 is ignited by the application of the electrical ignition signal or current over the energy transfer lines 20 to the initiator interface units 18. The ignited energetic material 14 heats the tubing causing the clamping device 30 to revert to its original memory shape of a toroidal configuration with the height of the tubing in contact with the sheet materials 36 and 38 increasing in measurement and clamping sheet materials 36 and 38 against the two confronting surfaces 40 and 42. It will be appreciated that other elements such as tubes or an object with a flange could be substituted in place of sheet materials 36 and 38. With reference to FIG. 8, clamping device 60 is shown in operative position to cause a tensile failure of fasteners and also to then clamp a structure which is part of an unmanned spacecraft. Clamping device 60 is functionally the same as clamping device 10 and is operatively positioned around a boom 62 whose first or outer end 64 is covered by plate 66. Plate 66 is attached to a portion of the main structure 68 of the spacecraft by a plurality of rivets 70 formed from a soft metal such as aluminum. Boom 62 lies in a first plane. Spring means 72, which is positioned against a second end of boom 62, forces the first or outer end 64 against plate 66. Clamping device 60 has been deformed such that the cross-sectional shape of the tubing is non-circular. In the preferred embodiment, the non-circular shape is elliptical or oval with the major axis of the ellipse or oval lying generally in a second plane which is generally perpendicular to the first plane. Clamps 67, which are attached to main structure 68, maintain clamping device 60 is position with respect to main structure 68. Clamps 67 are formed from a resilient material which allows expansion of clamping device 60 in and along the first plane while maintaining the relative position of the clamping device 60 to the main structure 68. Upon ignition of the energetic material within clamping device 60, the cross-sectional shape of the tubing is mechanically expanded back to a generally circular cross-sectional shape which provides a force in the first plane and against plate 66 which causes the separation of rivets 70. Spring means 72 provides the force which fully extends boom 62 outwardly from the spacecraft. As the tubing of clamping device 60 is heated, the tubing is reconfigured by martensitic action, due to the shape memory effect, into a toroidal configuration whereby the inner diameter of the clamping device 60 is decreased to provide a clamping force against boom 62 to maintain boom 62 in a fully extended position. The clamping force is in the second plane which is perpendicular to the first plane.

Thus, it is apparent that there has been provided in accordance with this invention, a method and device for providing a multidirectional clamping force to clamp material against a structure and also for providing a first force along a first plane and a second force along a second plane which is perpendicular to the first plane.

Although the present invention has been described with reference to a presently preferred embodiment, it will be appreciated by those skilled in the art that various modifications, alternatives, variations, etc., may be be made without departing from the spirit and scope of the invention as defined in the appended claims.

I claim:

1. Apparatus for providing a multidirectional clamping force to clamp material against a curved structure with the material being positioned between the apparatus and the curved structure, said apparatus comprising:
   a tube, generally circular in cross-sectional shape, formed into a generally toroidal configuration defining a generally circular opening with a predetermined diameter, said tube being formed of a shape memory alloy and deformed in a predetermined direction such that the cross-sectional shape of said tube is non-circular and the diameter of the generally circular opening after the tube has been deformed is greater than the predetermined diameter;
   energetic material loaded within the hollow portion of the tube; and
   an ignition system operatively positioned with respect to the tube and capable of igniting said energetic material;
   whereby said tube is mechanically expanded, by the force provided by the ignition of the energetic material, back to a generally circular cross-sectional shape and said tube is heated upon the ignition of said energetic material and is reconfigured by martensitic action with a decrease in the value of the diameter of the generally circular opening resulting in the clamping of the material against the curved surface.

2. The apparatus of claim 1 wherein said energetic material comprises an explosive and a thermitic compound.

3. The apparatus of claim 2 wherein said explosive comprises HNS.

4. The apparatus of claim 2 wherein said thermitic compound comprises magnesium teflon.

5. The apparatus of claim 1 wherein said cross-sectional shape of said tube after being deformed is generally an ellipse.

6. The apparatus of claim 5 wherein the major axis of said generally elliptical tube lies in a plane generally perpendicular to the plane of the desired direction of force.

7. Apparatus for providing a multidirectional clamping force to clamp material against a first generally planar structure with the material positioned between the apparatus and the first generally planar structure and the apparatus positioned between the material and a second generally planar structure positioned generally parallel to the first generally planar structure, said apparatus comprising:

a tube, generally circular in cross-sectional shape, formed into a generally toroidal configuration defining a generally circular opening with a predetermined diameter, a centerline of said tube lying generally in a plane, said tube being formed of a shape memory alloy and deformed in a predetermined direction such that the cross-sectional shape of said tube is non-circular and the height of the tube as measured perpendicular to said plane is less after deformation than before deformation;

energetic material loaded within the hollow portion of said tube; and an ignition system operatively positioned with respect to the tube and capable of igniting said energetic material;

whereby said tube is mechanically expanded, by the force provided by the ignition of the energetic material, back to a generally circular cross-sectional shape and said tube is heated upon the ignition of said energetic material and is reconfigured by martensitic action with an increase in the value of the height of the tube as measured perpendicular to said plane resulting in the clamping of the material against the first generally planar structure.

8. The apparatus of claim 7 wherein said energetic material comprises an explosive and a thermitic compound.

9. The apparatus of claim 8 wherein said explosive comprises HNS.

10. The apparatus of claim 8 wherein said thermitic compound comprises magnesium teflon.

11. The apparatus of claim 7 wherein said cross-section of said tube after being deformed is generally an ellipse.

12. The apparatus of claim 11 wherein the major axis of said generally elliptical tube lies in a plane generally perpendicular to the plane of the desired direction of force.

13. Apparatus for providing a linear force in a first direction lying in a first plane and a clamping force lying in a second plane which is generally perpendicular to the first plane, said apparatus comprising:

a tube, generally circular in cross-sectional shape, formed into a generally toroidal configuration defining a generally circular opening with a predetermined diameter, said tube being formed of a shape memory alloy and deformed in a predetermined direction such that the cross-sectional shape of said tube is non-circular, the height of the tube as measured perpendicular to the second plane is less after deformation than before deformation and the diameter of the generally circular opening after the tube has been deformed is less than the predetermined diameter;

energetic material loaded within the hollow portion of said tube; and an ignition system operatively positioned with respect to the tube and capable of igniting said energetic material;

whereby said tube is mechanically expanded, by the force provided by the ignition of the energetic material, back to a generally circular cross-sectional shape to provide a linear force in the first plane and said tube is heated upon the ignition of said energetic material and is reconfigured by martensitic action with a decrease in the value of the diameter of the generally circular opening after the tube had been deformed resulting in a clamping force in said second plane.

14. The apparatus of claim 13 wherein said energetic material comprises an explosive and a thermitic compound.

15. The apparatus of claim 14 wherein said explosive comprises HNS.

16. The apparatus of claim 14 wherein said thermitic compound comprises magnesium teflon.

17. The apparatus of claim 13 wherein said cross-section of said tube after being deformed is generally an ellipse.

18. The apparatus of claim 17 wherein the major axis of said generally elliptical tube lies in said second plane.

19. A method of clamping material against a curved structure, said method comprising the steps of:

providing a tube formed into a generally toroidal configuration defining a generally circular opening with a predetermined diameter and formed of a shape memory alloy and deformed in a predetermined direction such that the cross-sectional shape of said tube is non-circular and the diameter of the opening after the tube has been deformed is greater than the predetermined diameter, said tube having an energetic material loaded within the hollow portion of the tube and including an ignition system capable of igniting said energetic material;

positioning said tube around the material and the curved structure with the material positioned between the tube and the curved structure; and activating said ignition system which ignites said energetic material causing said tube to be reconfigured back to a generally circular cross-sectional shape by mechanical expansion provided by the force provided by the ignition of the energetic material and reconfigured by martensitic action with a decrease in the value of the inside diameter of the generally circular opening resulting in the clamping of the material against the curved structure.

20. A method of clamping material against a predetermined one of two confronting surfaces, said method comprising the steps of:

providing a tube formed into a generally toroidal configuration defining a generally circular opening with a predetermined diameter and formed of a shape memory alloy and deformed in a predetermined direction such that the cross-sectional shape of said tube is non-circular and the diameter of the opening after the tube has been deformed is less than the predetermined diameter, said tube having an energetic material loaded within the hollow portion of the tube and including an ignition system capable of igniting said energetic material;

positioning the material between the predetermined one of two confronting surfaces and said tube with said tube positioned between the material and the other confronting surface; and activating said ignition system which ignites said energetic material causing said tube to be reconfigured back to a generally circular cross-sectional shape by mechanical expansion provided by the force provided by the ignition of the energetic material and reconfigured by martensitic action with an increase in the value of the inside diameter of the generally circular opening resulting in the clamping of the material against the predetermined one of the two confronting surfaces.

* * * * *